United States Patent
Savage, Jr.

[11] Patent Number: 5,732,176
[45] Date of Patent: *Mar. 24, 1998

[54] LIGHT PIPE OPTICAL COUPLING BETWEEN LED AND FIBER OPTICS CABLE

[76] Inventor: John M. Savage, Jr., 538-B Via De La Valle, Solana Beach, Calif. 92075

[*] Notice: The term of this patent shall not extend beyond the expiration date of Pat. No. 5,548,676.

[21] Appl. No.: 629,902

[22] Filed: Apr. 10, 1996

Related U.S. Application Data

[63] Continuation-in-part of Ser. No. 391,113, Feb. 21, 1995, Pat. No. 5,548,676, which is a continuation-in-part of Ser. No. 278,246, Jul. 21, 1994, Pat. No. 5,440,658, which is a continuation-in-part of Ser. No. 142,938, Oct. 29, 1993, Pat. No. 5,466,174, which is a continuation-in-part of Ser. No. 82,963, Jun. 29, 1993, Pat. No. 5,368,503.

[51] Int. Cl.⁶ ............................................. G02B 6/42
[52] U.S. Cl. .................................... 385/92; 385/88
[58] Field of Search ........................ 385/53, 88, 92–94, 385/136–139, 147

[56] References Cited

U.S. PATENT DOCUMENTS

| | | | |
|---|---|---|---|
| D. 200,157 | 1/1965 | Vincent | D13/146 |
| 1,747,896 | 2/1930 | Gates | 439/682 |
| 2,042,199 | 5/1936 | Thomas | 362/226 |
| 2,396,725 | 3/1946 | Thomas, Jr. | 439/590 |
| 2,786,937 | 3/1957 | Arnejo | 362/308 |
| 2,796,593 | 6/1957 | Offerman | 439/683 |
| 2,829,359 | 4/1958 | Ritter | 439/56 |
| 2,949,595 | 8/1960 | Doeleman | 338/70 |
| 2,951,226 | 8/1960 | Gittens | 439/58 |
| 2,977,562 | 3/1961 | Benson | 439/58 |
| 2,999,895 | 9/1961 | Smith | 174/138 G |
| 3,184,536 | 5/1965 | Vincent | 174/138 G |
| 3,335,387 | 8/1967 | Mueller | 439/56 |
| 3,564,231 | 2/1971 | Bruce et al. | 385/88 X |
| 3,601,786 | 8/1971 | Brubaker | 439/853 |
| 3,621,145 | 11/1971 | Horecky et al. | 439/81 |
| 3,624,385 | 11/1971 | Wall | 385/88 X |
| 3,663,931 | 5/1972 | Brown | 439/75 |
| 3,721,815 | 3/1973 | Wall | 385/88 X |
| 3,887,803 | 6/1975 | Savage, Jr. | 362/363 |
| 3,975,072 | 8/1976 | Ammon | 439/70 |
| 4,035,681 | 7/1977 | Savage, Jr. | 313/110 |
| 4,195,330 | 3/1980 | Savage, Jr. | 362/226 |
| 4,219,172 | 8/1980 | Murayama | 248/27.3 |
| 4,230,387 | 10/1980 | Zahn | 439/590 |
| 4,398,240 | 8/1983 | Savage, Jr. | 362/311 |
| 4,402,110 | 9/1983 | Savage, Jr. | 16/225 |
| 4,461,537 | 7/1984 | Raymer, II et al. | 385/88 |
| 4,471,414 | 9/1984 | Savage, Jr. | 362/226 |
| 4,491,900 | 1/1985 | Savage, Jr. | 362/230 |
| 4,513,356 | 4/1985 | Mikola | 362/226 |
| 4,691,985 | 9/1987 | Shank et al. | 385/84 |
| 4,711,518 | 12/1987 | Shank et al. | 385/79 |
| 4,727,648 | 3/1988 | Savage, Jr. | 29/839 |
| 4,821,152 | 4/1989 | Lorenzen | 361/767 |
| 4,822,302 | 4/1989 | Dorleans | 439/544 |
| 4,837,927 | 6/1989 | Savage, Jr. | 29/839 |
| 4,986,625 | 1/1991 | Yamada et al. | 385/55 |
| 4,986,772 | 1/1991 | Fukutani | 439/892 |
| 5,068,771 | 11/1991 | Savage, Jr. | 362/255 |

(List continued on next page.)

FOREIGN PATENT DOCUMENTS

| | | |
|---|---|---|
| 2390032 | 12/1978 | France. |
| 1464176 | 2/1969 | Germany. |
| 2250007 | 5/1974 | Germany. |
| 2918620 | 11/1980 | Germany. |
| 2081516 | 2/1982 | United Kingdom. |

*Primary Examiner*—John D. Lee
*Attorney, Agent, or Firm*—William W. Haefliger

[57] ABSTRACT

In combination, a tubular mounting structure having a longitudinal axis; an LED received by the mounting structure and having a light emitter and a light-passing lens oriented along the axis; a cable having optical fibers defining a light entrance end at a location facing longitudinally toward the LED, and spaced therefrom; and a light-transmitting light pipe received in the mounting structure, and located longitudinally between the LED lens and the cable entrance end.

34 Claims, 18 Drawing Sheets

U.S. PATENT DOCUMENTS

| | | | |
|---|---|---|---|
| 5,071,375 | 12/1991 | Savage, Jr. | 439/853 |
| 5,163,109 | 11/1992 | Okugawa et al. | 385/94 |
| 5,193,099 | 3/1993 | Chou | 372/107 |
| 5,283,802 | 2/1994 | Hsiung | 372/107 |
| 5,288,242 | 2/1994 | Muzslay | 439/349 |
| 5,368,503 | 11/1994 | Savage, Jr. | 439/502 |
| 5,440,658 | 8/1995 | Savage, Jr. | 385/79 |
| 5,466,174 | 11/1995 | Savage, Jr. | 439/596 |
| 5,548,676 | 8/1996 | Savage, Jr. | 385/92 |

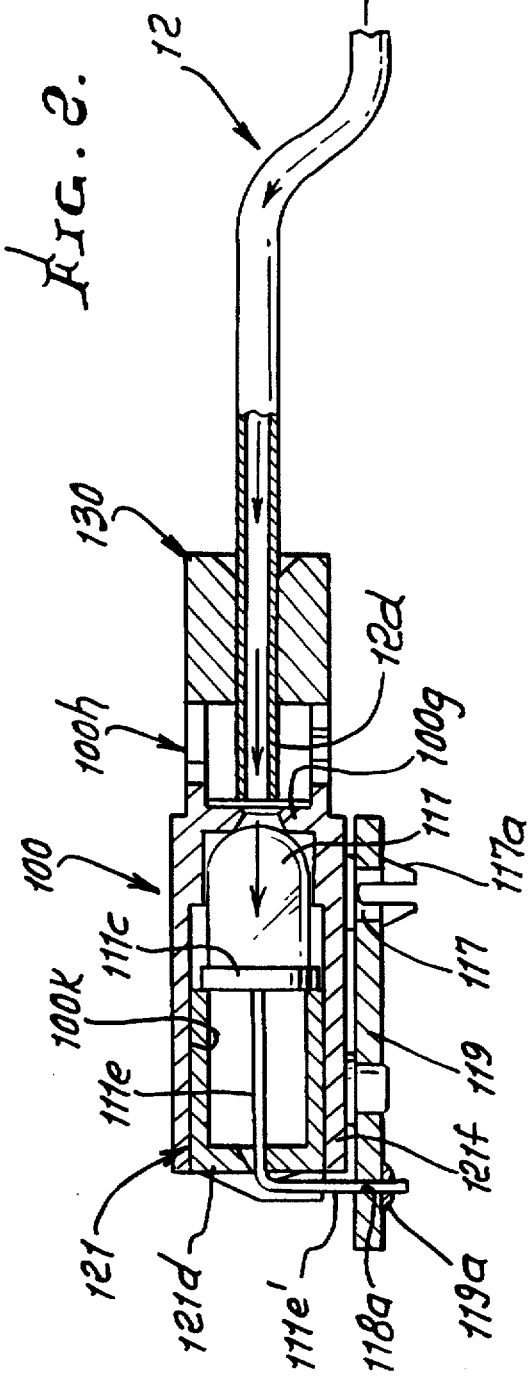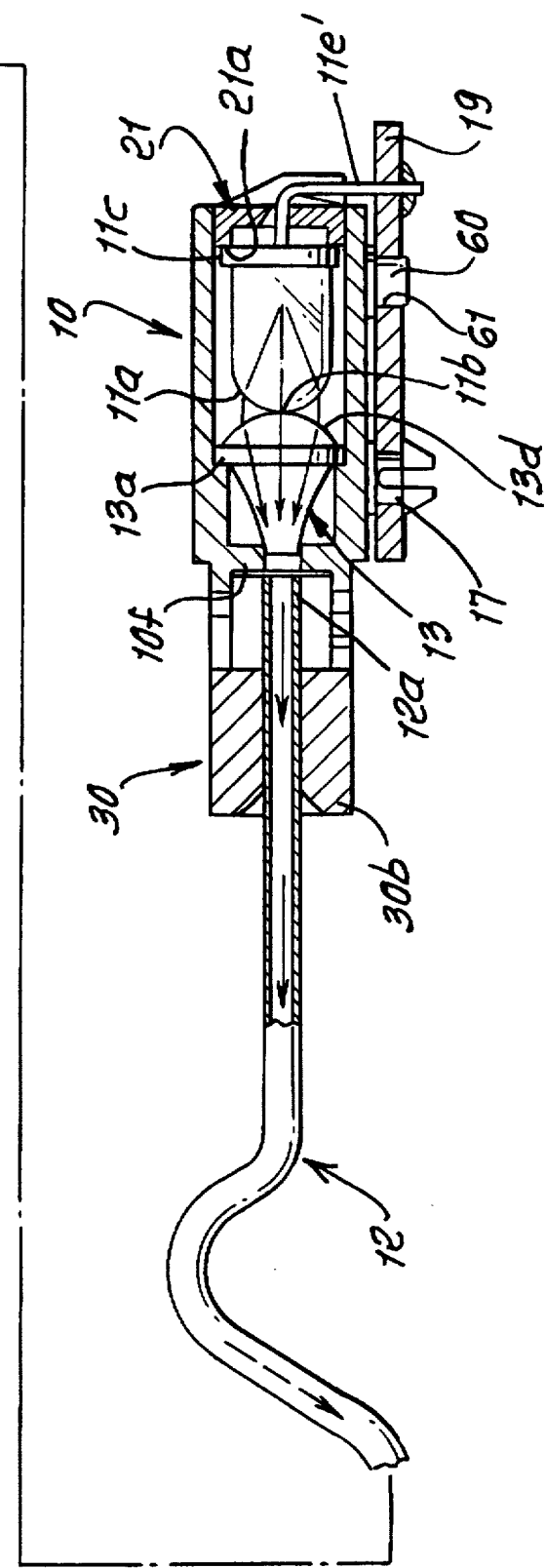
FIG. 2.

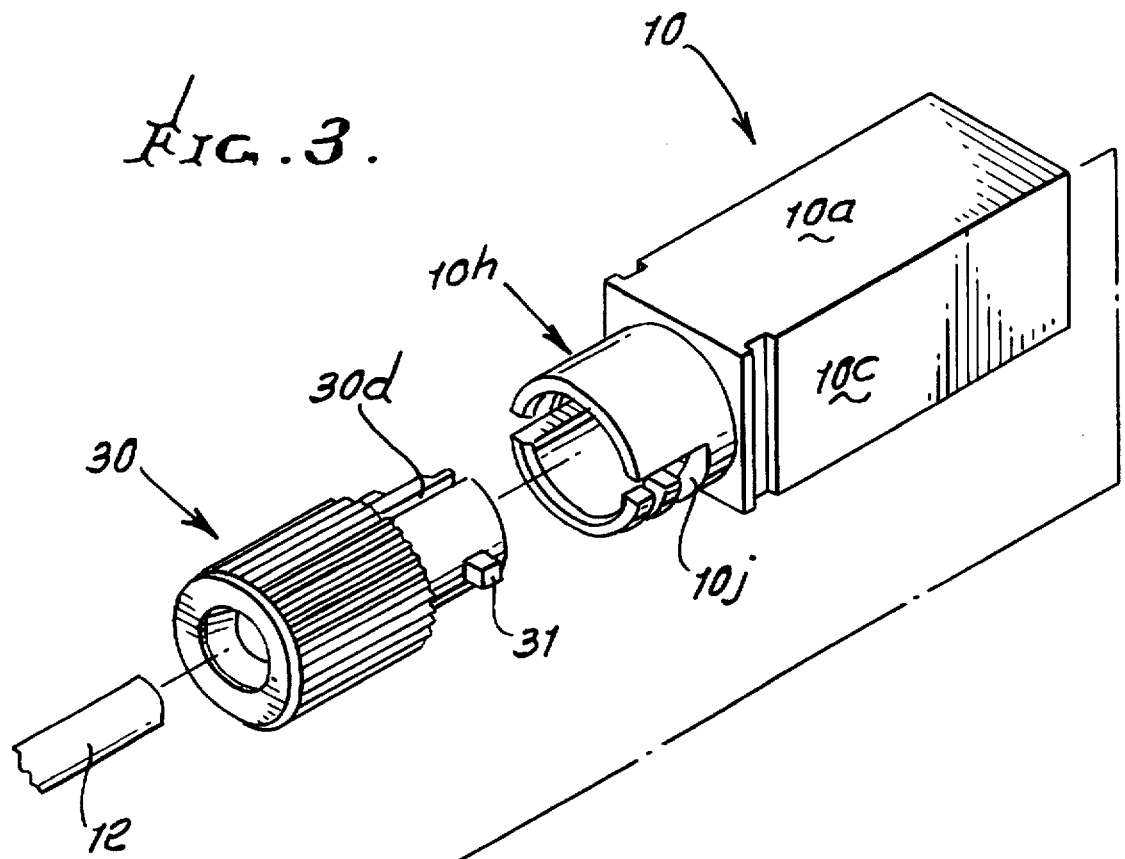
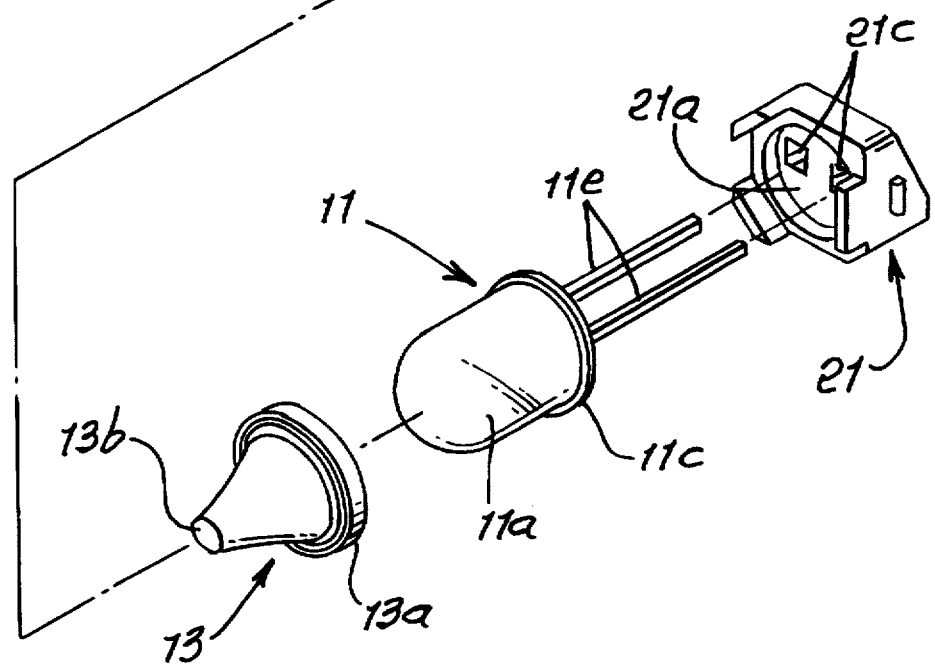

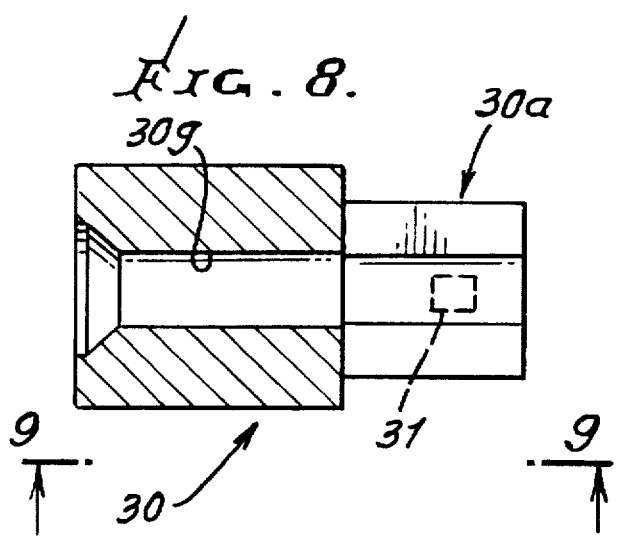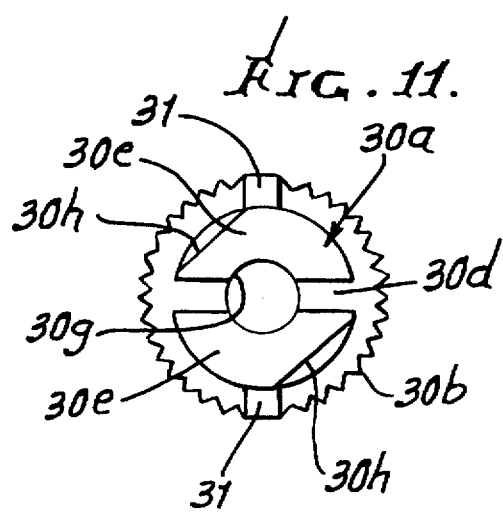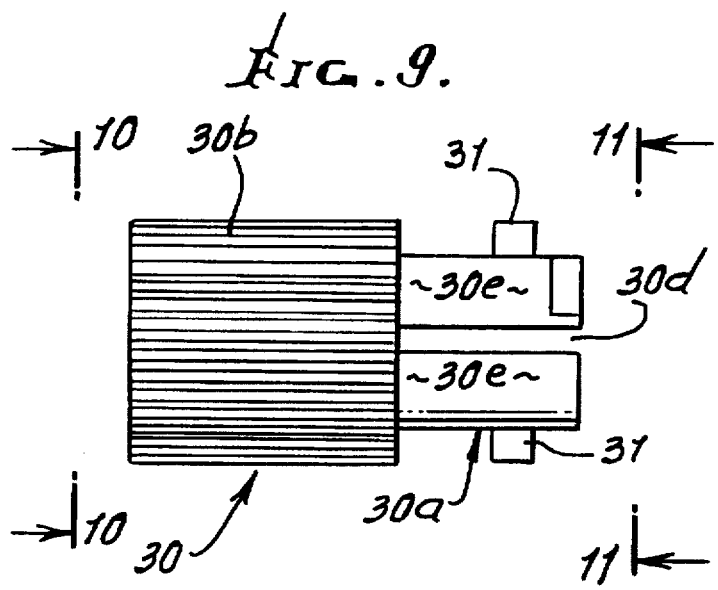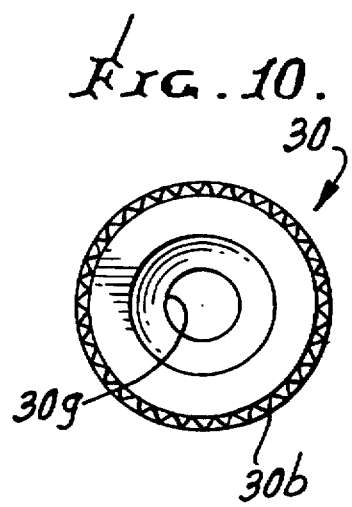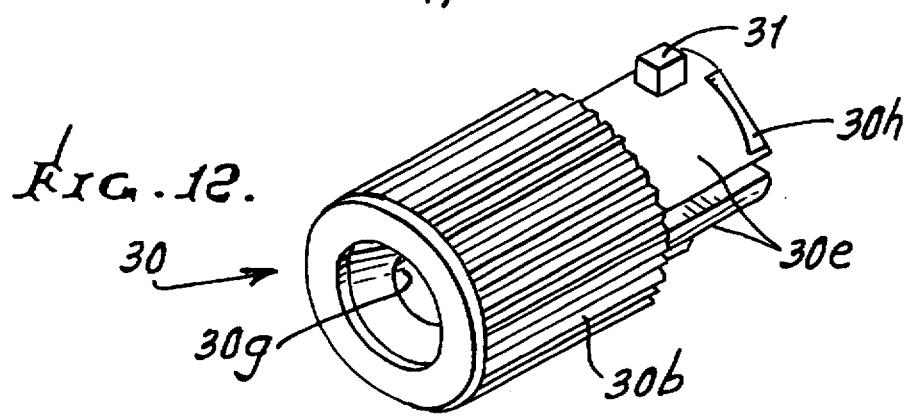

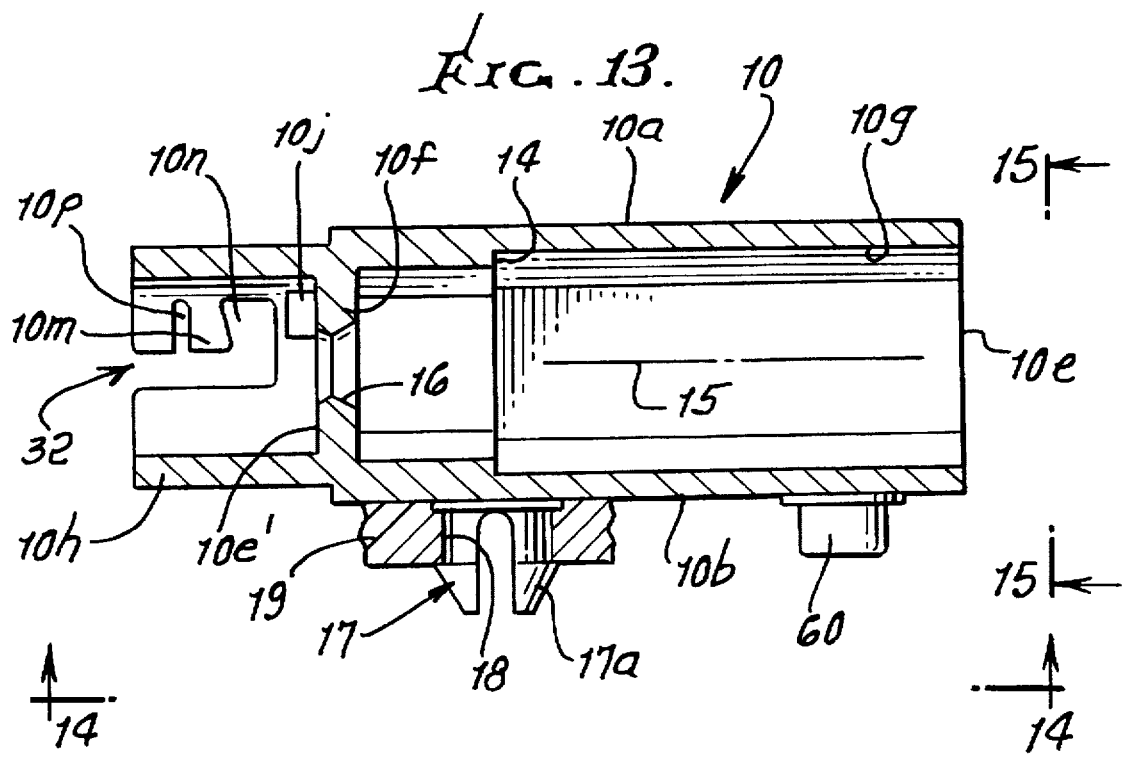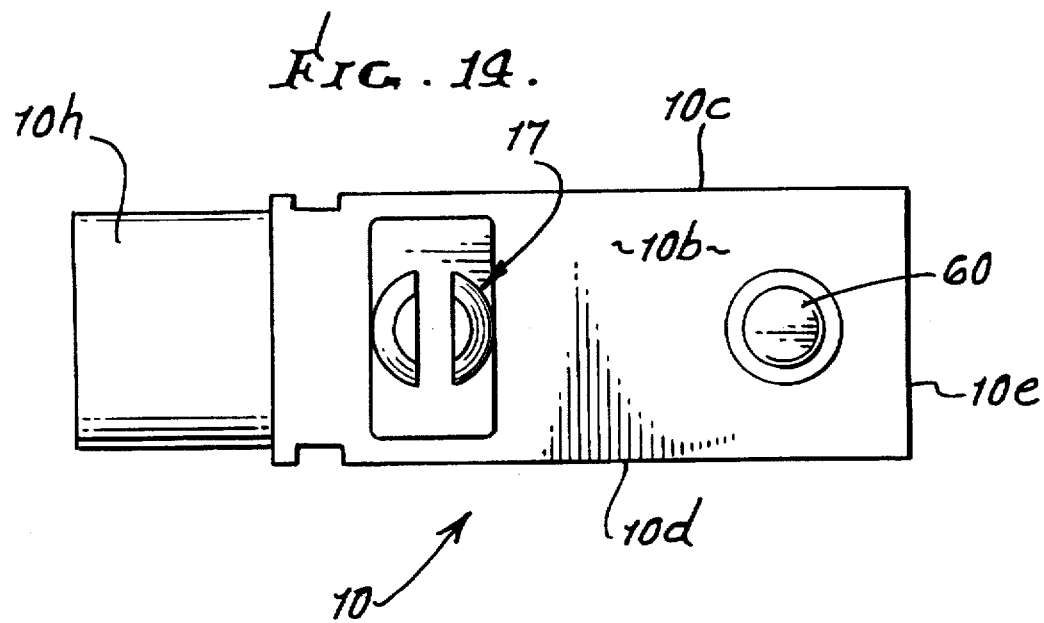

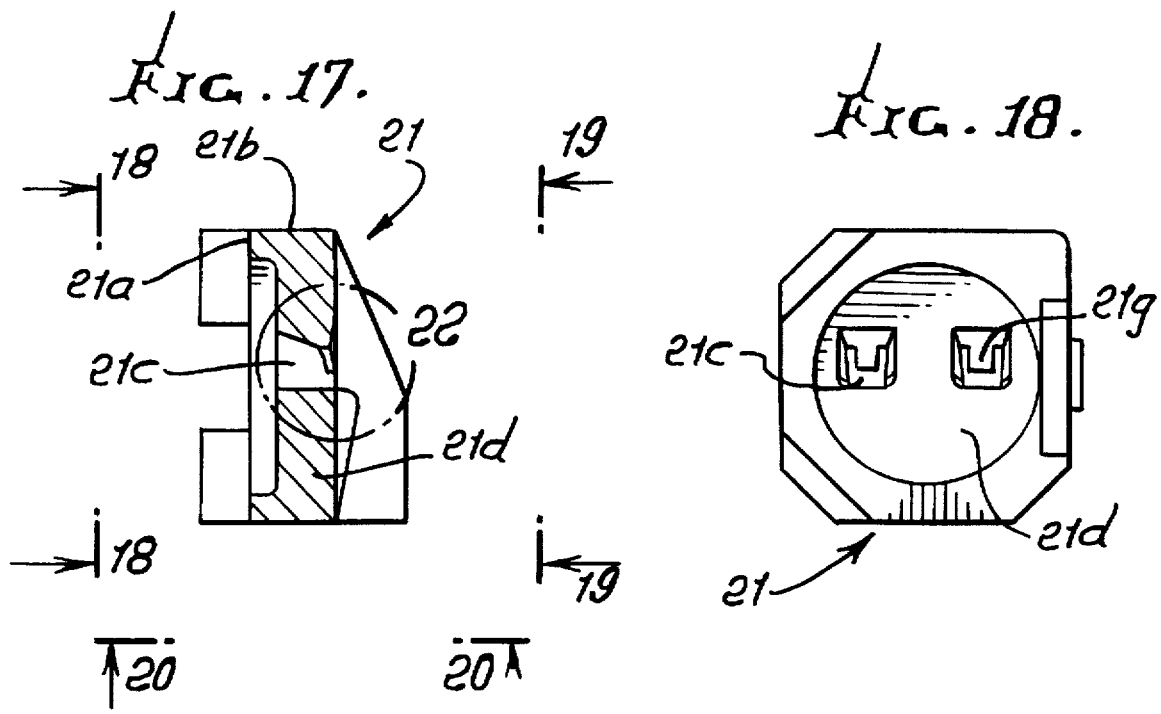
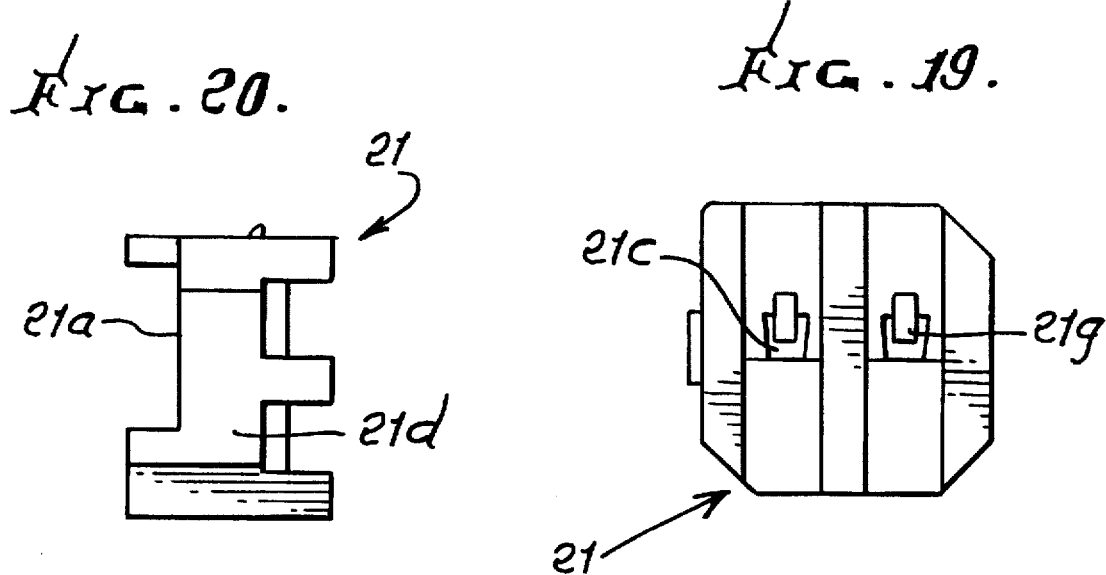

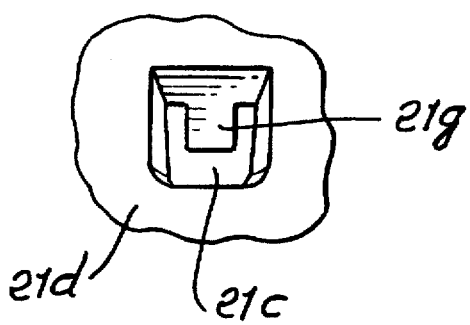
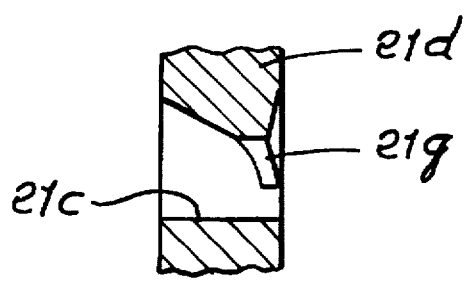
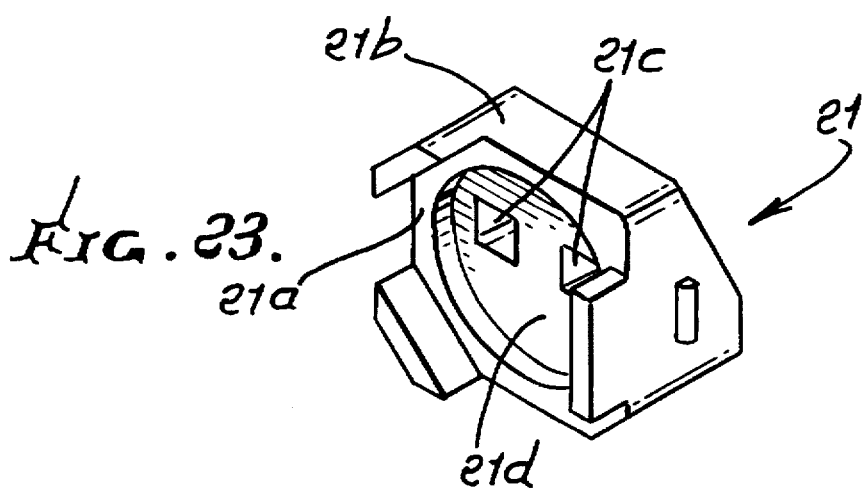
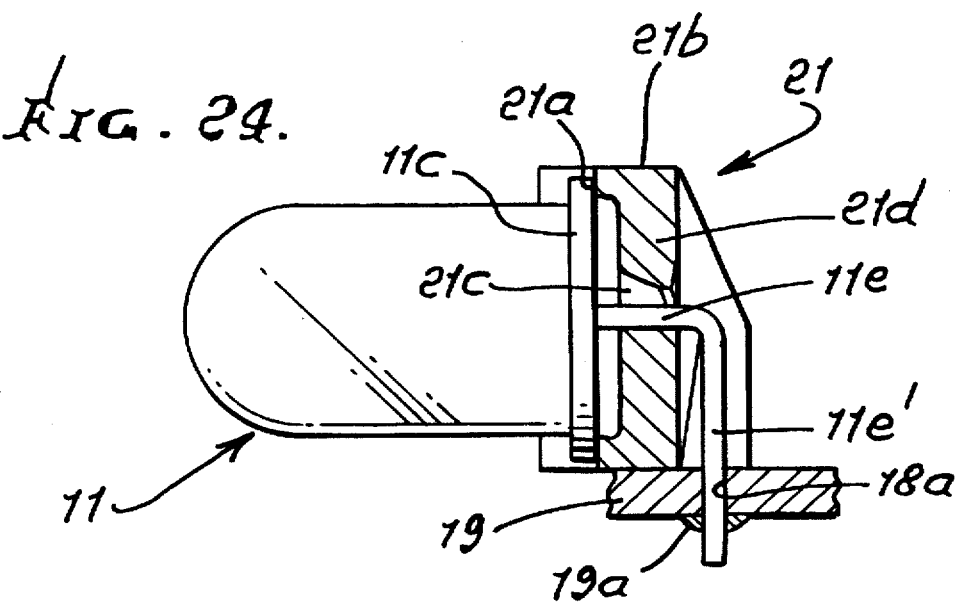

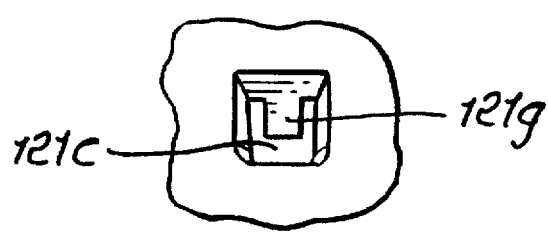
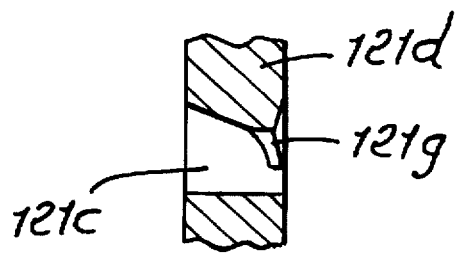
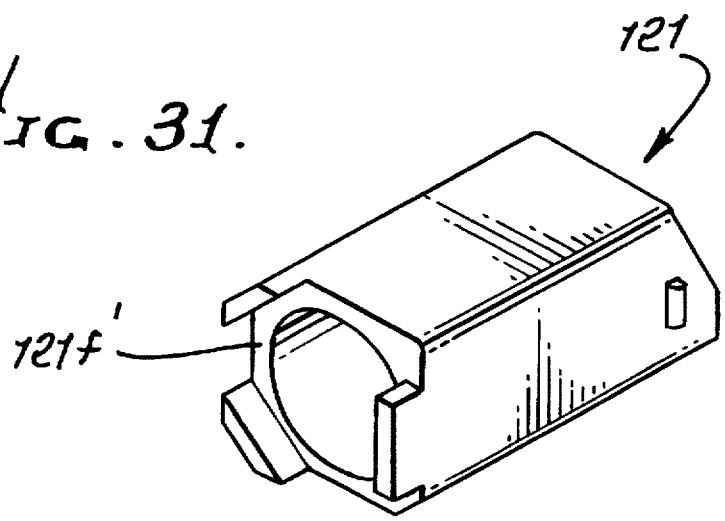
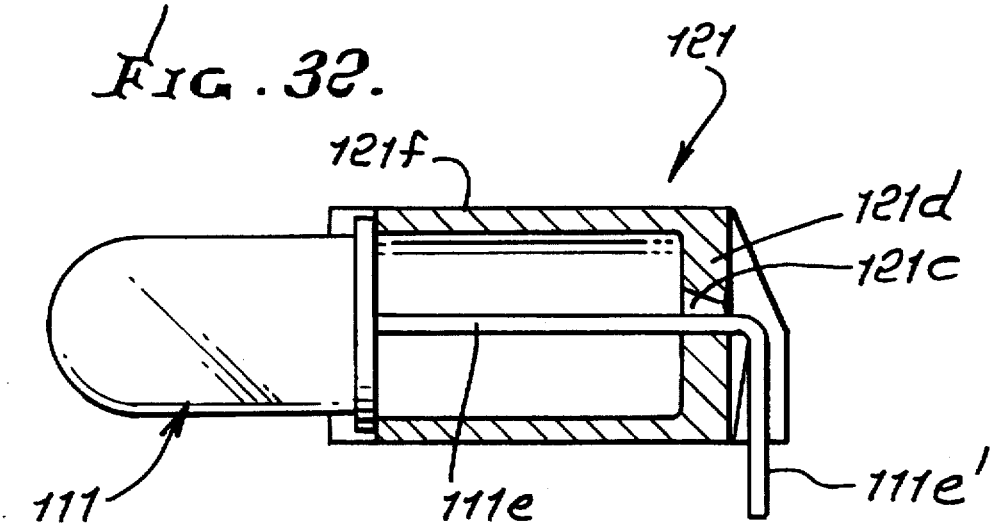

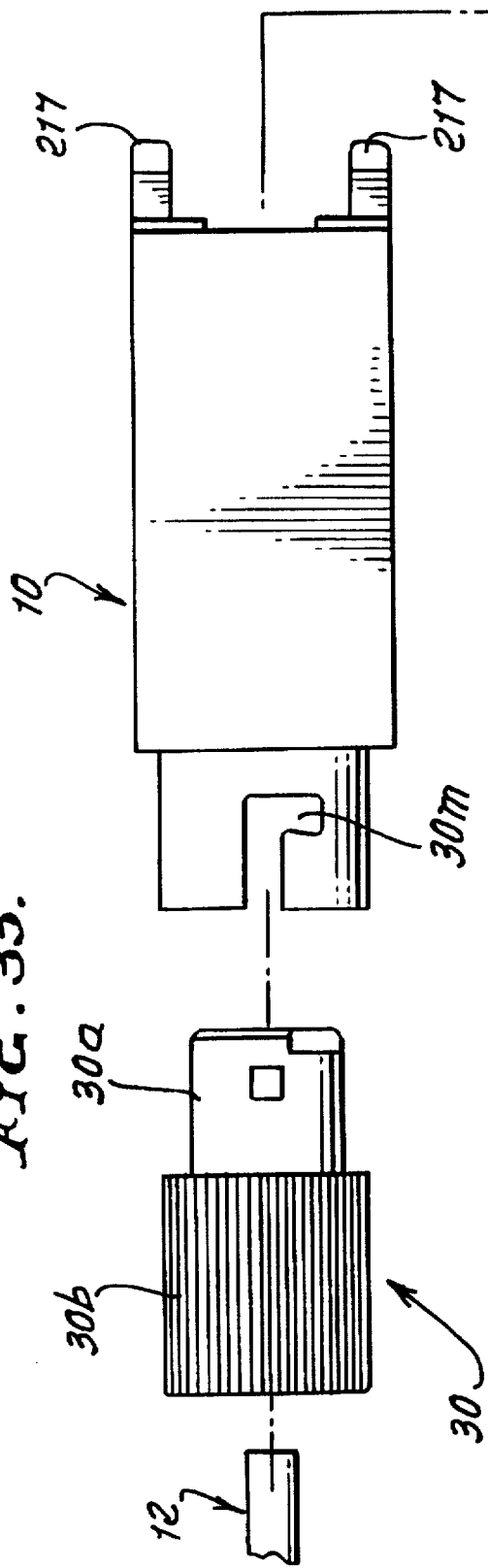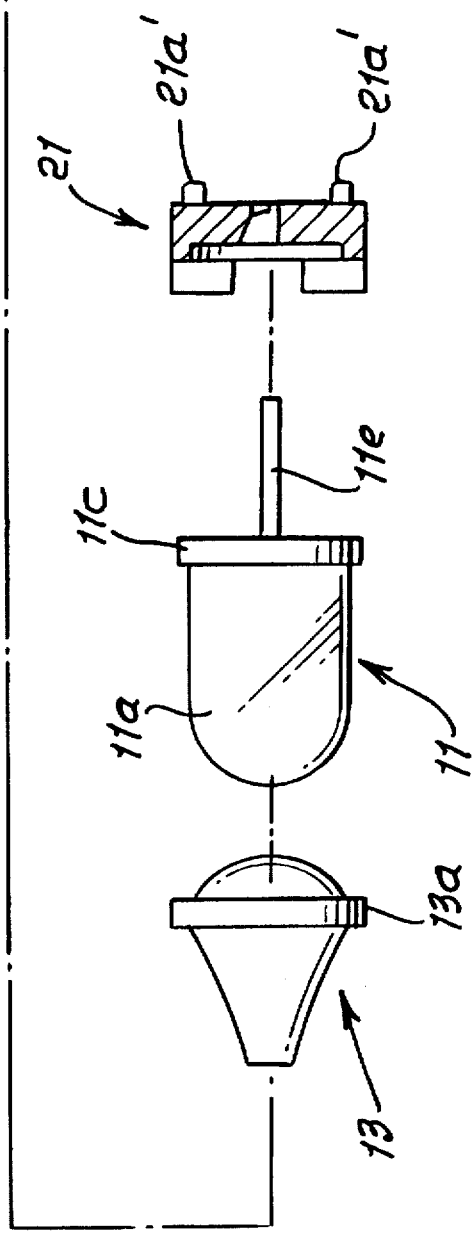
FIG. 33.

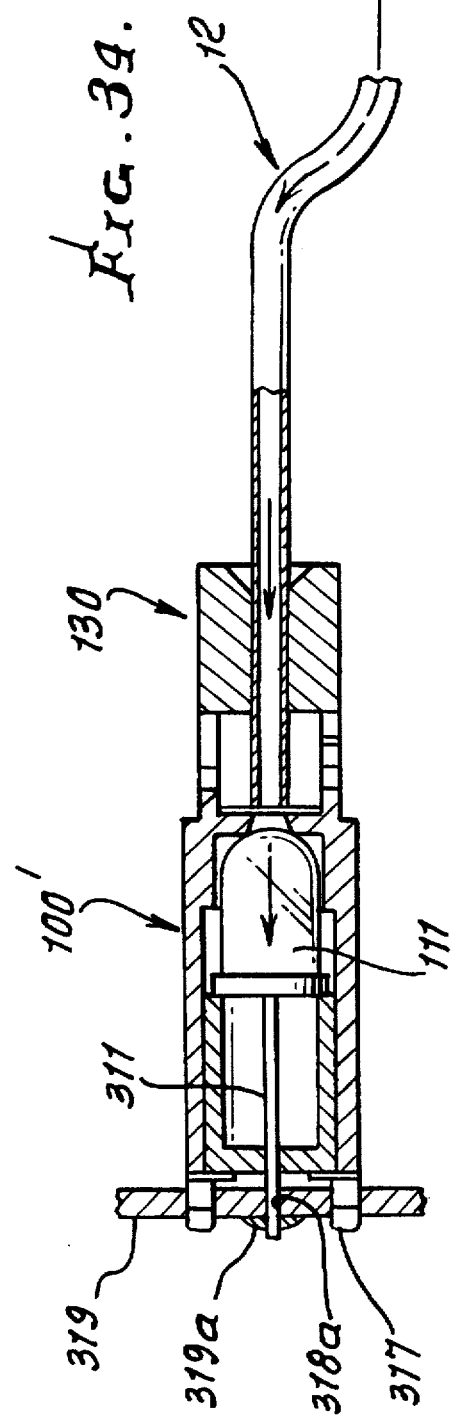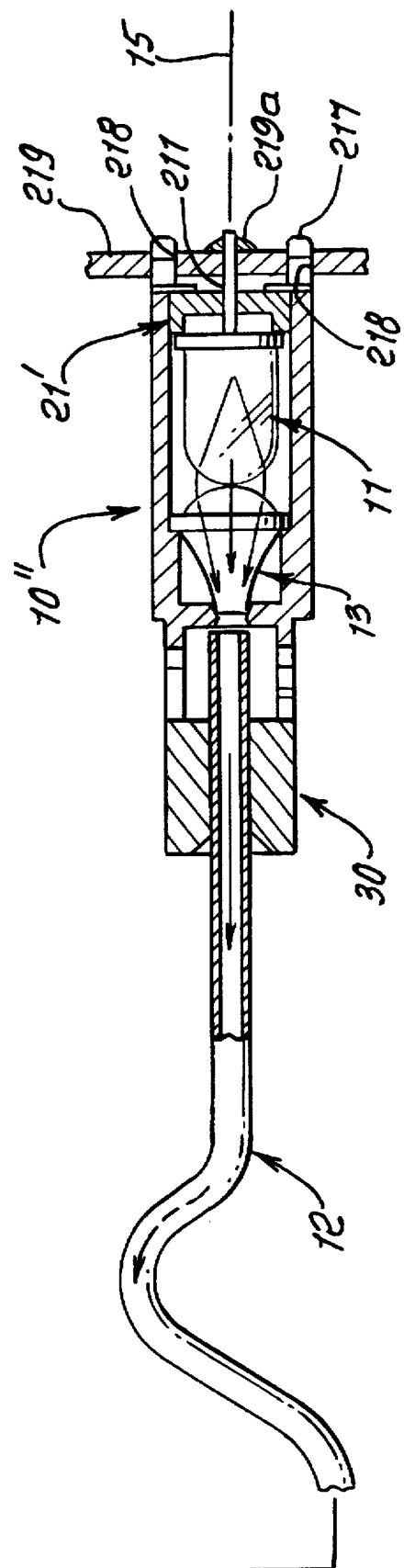
FIG. 39.

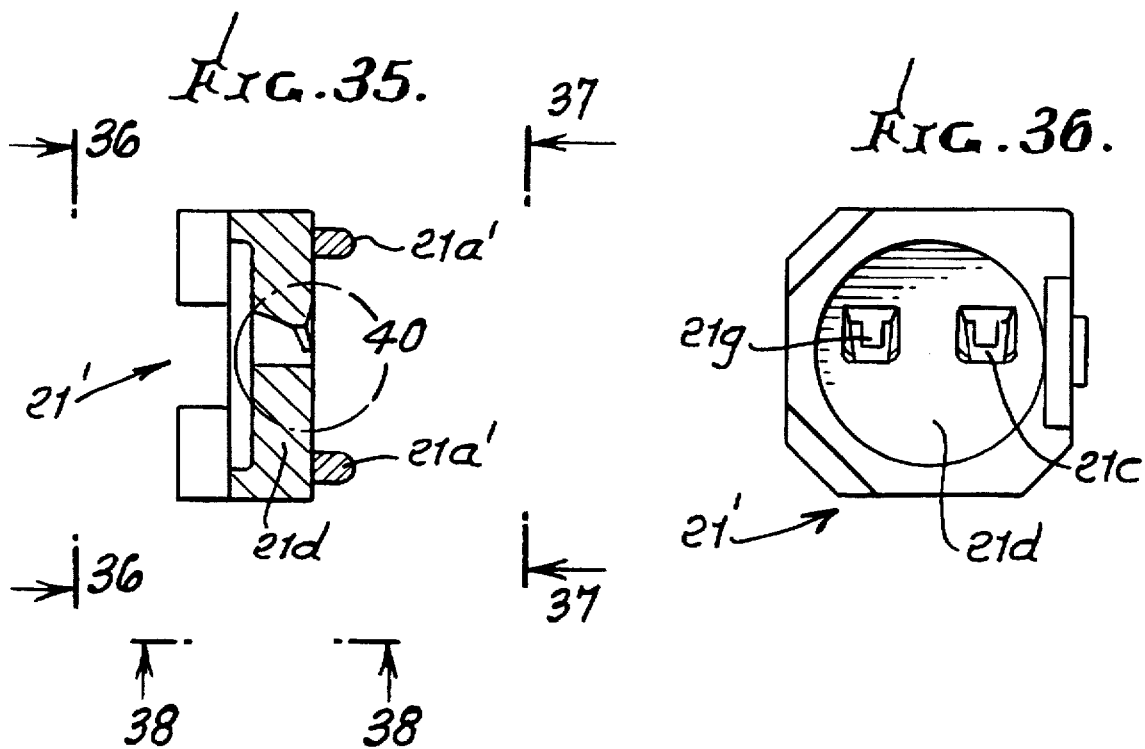
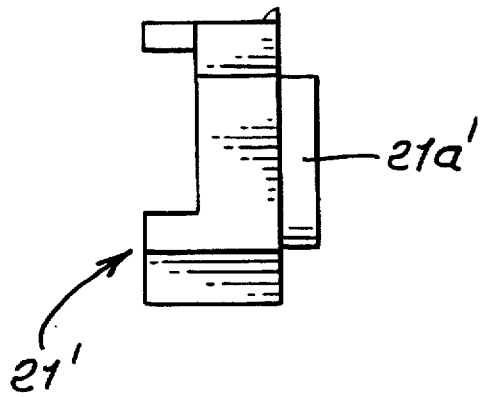
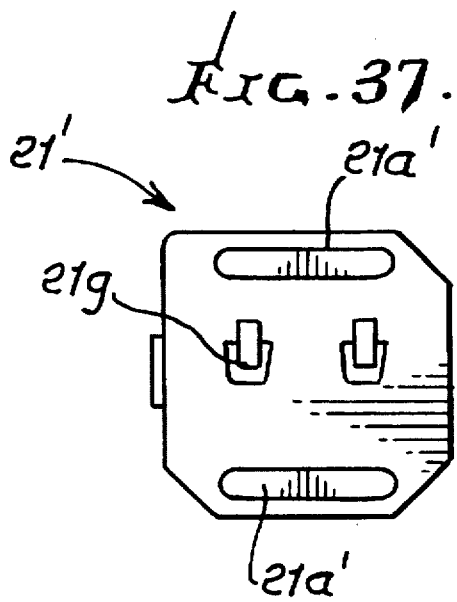

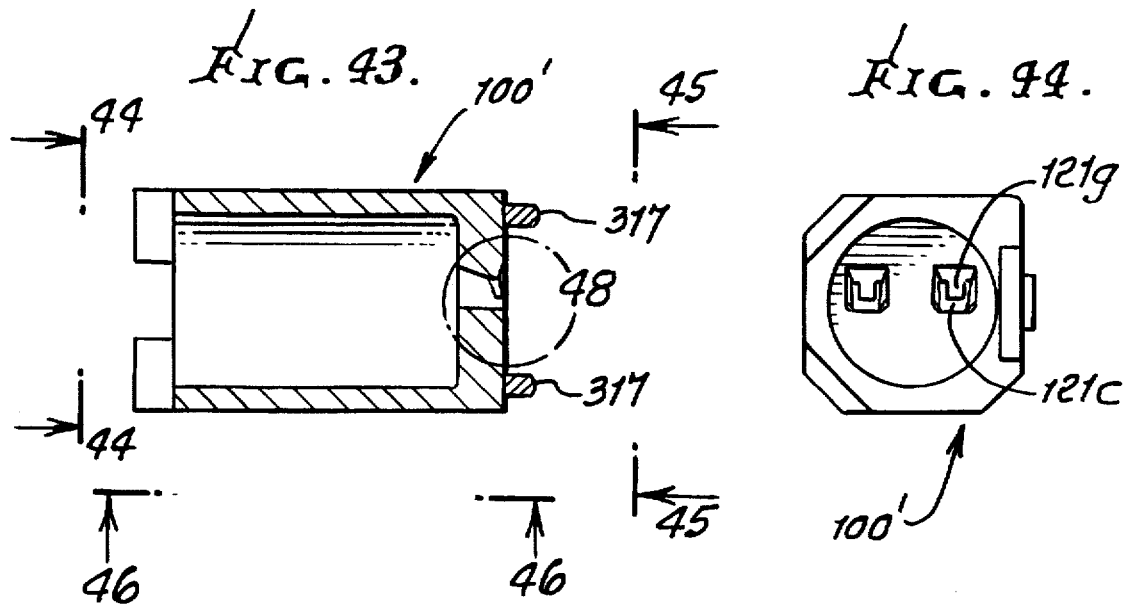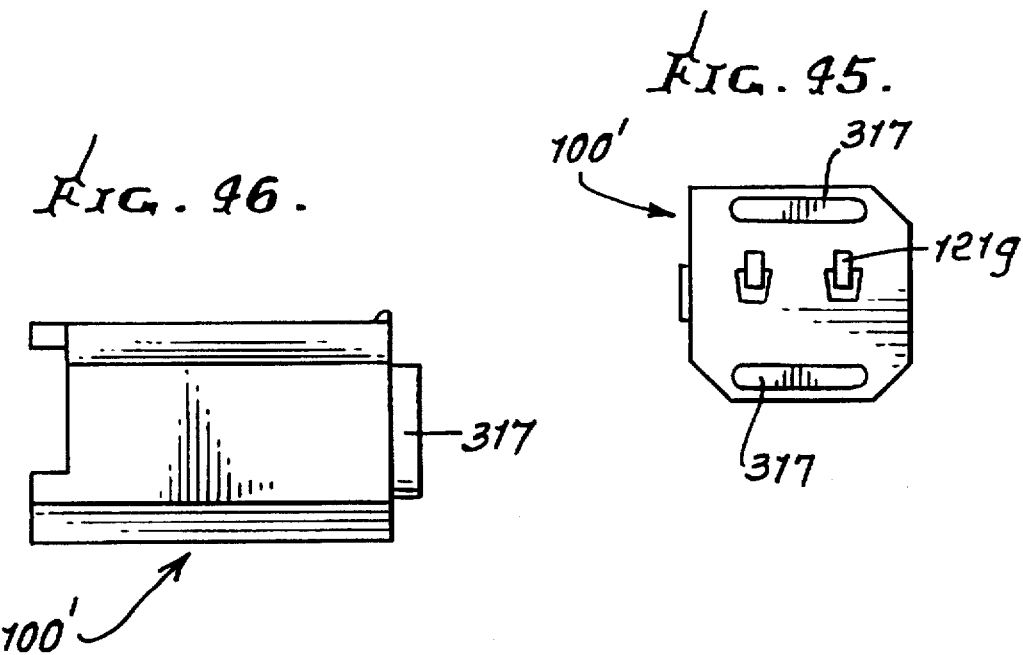

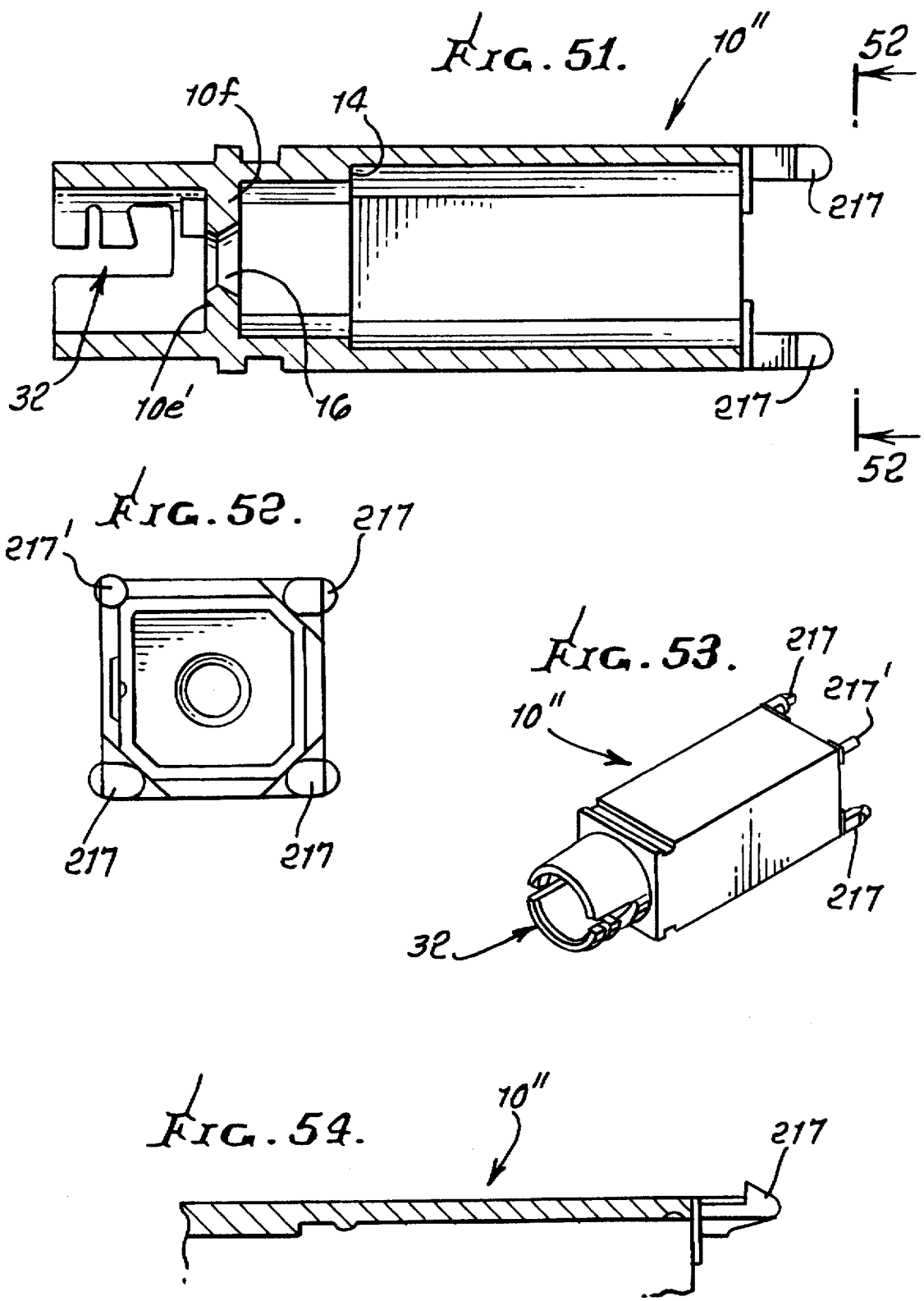

LIGHT PIPE OPTICAL COUPLING BETWEEN LED AND FIBER OPTICS CABLE

This application is a continuation-in-part of prior U.S. application Ser. No. 08/391,113 filed Feb. 21, 1995, now U.S. Pat. No. 5,548,676 which is a continuation-in-part of prior U.S. application Ser. No. 08/278,246 filed Jul. 21, 1994, now U.S. Pat. No. 5,440,658, which is a continuation-in-part of prior U.S. application Ser. No. 08/142,938 filed Oct. 29, 1993, now U.S. Pat. No. 5,466,174, which is a continuation-in-part of prior U.S. application Ser. No. 08/082,963 filed Jun. 29, 1993, now U.S. Pat. No. 5,368,503.

BACKGROUND OF THE INVENTION

This invention relates generally to optical coupling of light sources and fiber optics cables, and more particularly, to optical coupling of light-emitting diodes (LEDs) to the light entrance ends of such cables.

There is need for improved apparatus and method to overcome inefficiencies and problems with prior coupling systems.

SUMMARY OF THE INVENTION

It is a major object to provide such improved apparatus and method. Basically, the invention comprises, in combination:

a) a tubular mounting means having a longitudinal axis, b) an LED received in the mounting means and having a light emitter and a light-passing lens oriented along the axis, c) a cable having optical fibers defining a light entrance end at a location facing longitudinally toward the LED, and spaced therefrom, and d) a light-transmitting light pipe received in the mounting means, and located longitudinally between the LED lens and the cable entrance end.

The light pipe transmits a maximum amount of light into the cable; and even though the LED should be produced to have its emitter off axis, slightly, the efficiency of light coupling from the LED to the fiber optics cable entrance end will not be materially reduced.

Further objects include the provision of a light pipe convex surface facing toward the LED, for efficient light coupling, the provision of such a light pipe to have a generally conical surface oriented to reflect light rays from the LED lens toward the cable entrance end; the provision and location of the light pipe to have a relatively large entrance end and a relatively small exit end, the entrance end proximate the LED lens, and the exit end proximate the cable entrance end.

Yet another object includes the provision of mounting means to include a tubular housing in which the light pipe is received, and a cable connector having grip connection to the cable, to locate and retain the cable in predetermined position; and means on the connector, to create compression in a simple, effective manner.

A further object includes the provision of a hollow connector integrally connected to the mounting means and having a first portion to receive the cable and to position the cable entrance end relative to the light pipe, the connector having grip means thereon responsive to rotary camming means, to grip the cable and to resist endwise withdrawal of the cable relative to the connector and mounting means. As will be seen, the grip means advantageously comprises cam urged sleeve sections on the connector.

Yet another object includes provision of a mounting panel to which the hollow connector and/or mounting means typically having telescopic interconnection, either sidewise or endwise.

An additional object includes provision of a similar mounting means to receive a light detector optically coupled to the opposite end of the cable.

Further objects include the provision of bases to support or carry the LED in one mounting means, and to support or carry the light detector in the similar and second mounting means.

These and other objects and advantages of the invention, as well as the details of an illustrative embodiment, will be more fully understood from the following specification and drawings, in which:

DRAWING DESCRIPTION

FIG. 2 is a cross section taken in elevation through complete assembly incorporating the invention;

FIG. 3 is an exploded perspective view of elements seen on FIG. 1;

FIG. 8 is a section taken through the connector element as seen in FIGS. 1 and 3;

FIG. 9 is a side elevation taken on lines 9—9 of FIG. 8;

FIG. 10 is an end view taken on lines 10—10 of FIG. 9;

FIG. 11 is an end view taken on lines 11—11 of FIG. 9;

FIG. 12 is a perspective view of the connector as seen in FIG. 9;

FIG. 13 is an enlarged section taken through the emitter housing seen in FIGS. 1 and 3;

FIG. 14 is a view taken on lines 14—14 of FIG. 13;

FIG. 17 is an enlarged side view taken in section through a base element as also seen in FIGS. 1 and 3;

FIG. 18 is an end view taken on lines 18—18 of FIG. 17;

FIG. 19 is an end view taken on lines 19—19 of FIG. 17;

FIG. 20 is a bottom view taken on lines 20—20 of FIG. 17;

FIG. 21 is an enlarged view showing a terminal opening, as also seen in FIG. 18;

FIG. 22 is an enlarged view of a terminal opening portion of FIG. 17 designated by lines 22—22;

FIG. 23 is a perspective view of the base, as seen in FIGS. 17-20;

FIG. 24 is a view like FIG. 17 but showing an LED carried by the base, and as also seen in FIG. 2;

FIG. 29 is an enlarged view showing a terminal opening, as also seen in FIG. 26;

FIG. 30 is an enlarged view of a terminal opening portion of FIG. 25, designated by the lines 30—30;

FIG. 31 is a perspective view of the elongated base, as seen in FIGS. 25–28;

FIG. 32 is a view like FIG. 25 but showing a light detector installed in the elongated base of FIG. 25;

FIG. 33 is an exploded view like FIG. 1 but showing a modified base element, to be incorporated in a modified emitter housing;

FIG. 34 is a cross sectional view like FIG. 2 but showing modified base elements in modified emitter and detector housing elements;

FIGS. 35–41 are views taken as shown and like those of FIGS. 18–23, but showing the modified base element to be incorporated in the modified emitter housing of FIGS. 33 and 34, and also FIGS. 50–54;

FIGS. 43–49 are views taken as shown and like those of FIGS. 25–31, but showing the modified base element to be incorporated in the modified detector housing of FIGS. 33 and 34;

FIG. 51 is a view like FIG. 13 but showing in section the modified emitter housing as shown in FIGS. 33 and 34;

FIG. 52 is an end view on lines 52—52 of FIG. 51;

FIG. 53 is a perspective view of the FIG. 51 housing; and

FIG. 54 is a section taken through a portion of FIG. 51.

DETAILED DESCRIPTION

Figure 1:
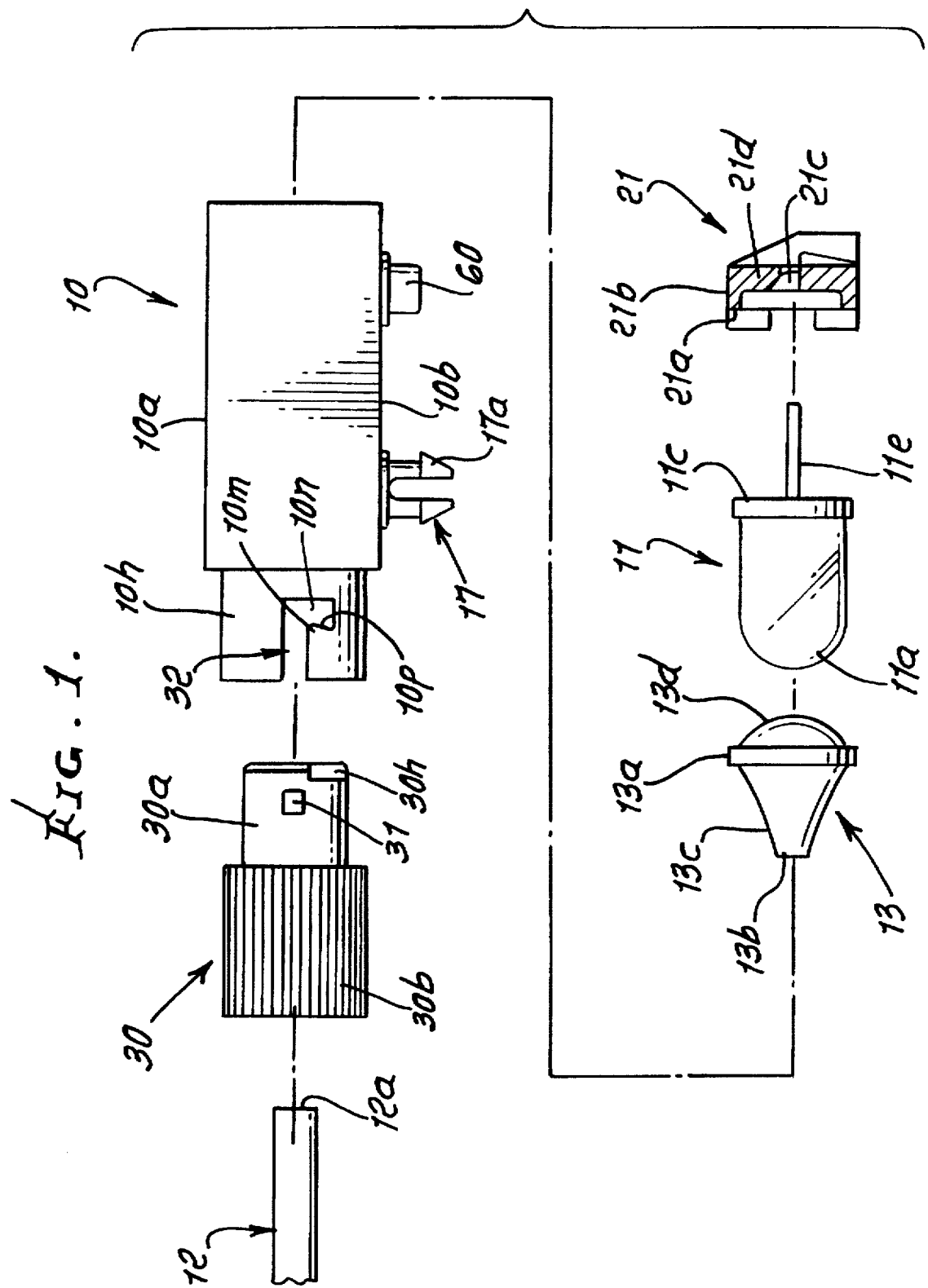
FIG. 1 is an exploded view showing elements of the invention.
Figure 5:
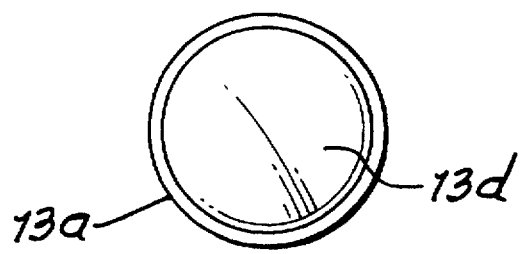
FIG. 5 is an end view taken on lines 5—5 of FIG. 4.
Figure 4:
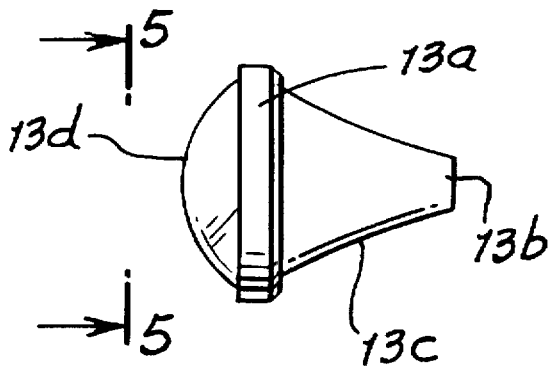
FIG. 4 is a side elevation view of a light pipe, as also seen in FIGS. 1 and 3.
Figure 6:
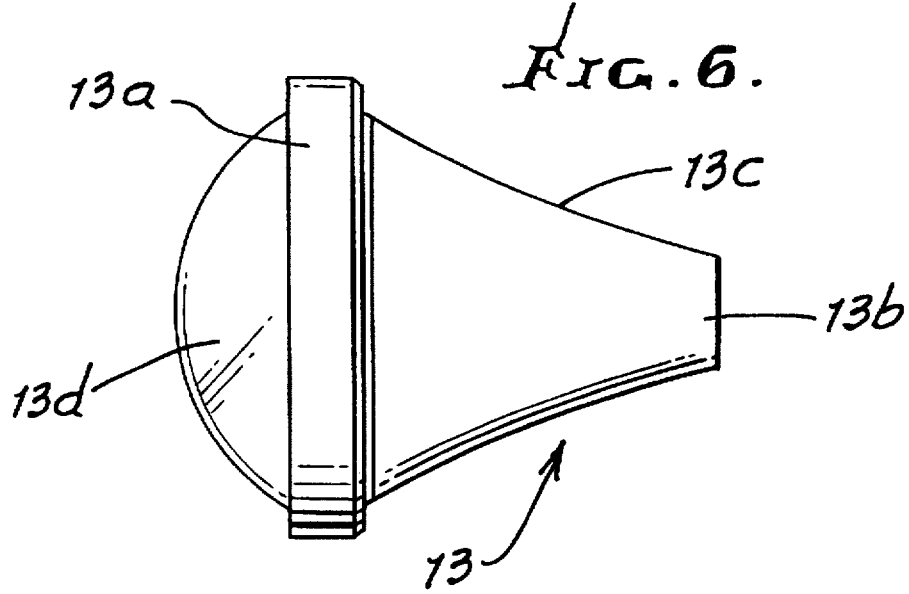
FIG. 6 is an enlarged side elevational view of the FIG. 4 light pipe.
Figure 7:
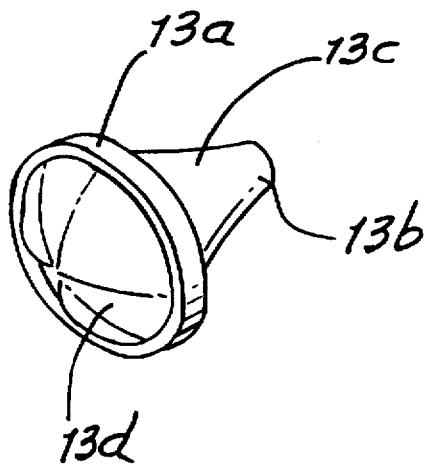
FIG. 7 is a perspective view of the FIG. 4 light pipe.

In the drawings, FIGS. 1 and 2, the basic elements include a mounting means, such as a tubular emitter housing, indicated generally at 10, an LED 11 received by or in the mounting means, a fiber optics cable 12 received by the mounting means in endwise axially spaced relation to the LED, as seen in FIG. 2; and a light pipe 13 located between the curved lens 11a of the LED, and the light entrance end 12a of the cable. The latter includes a single strand or a bundle of optical fibers, terminating at end 12a.

Figure 15:
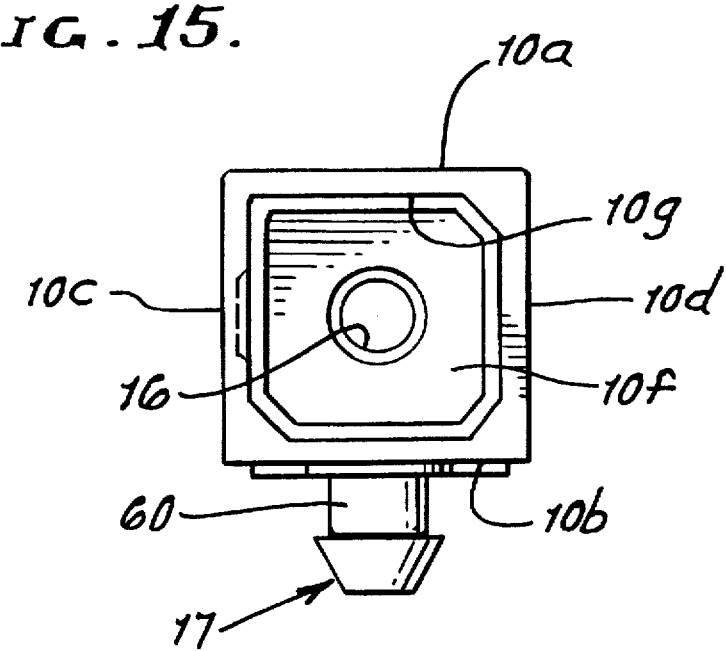
FIG. 15 is an end view taken on lines 15-15 of FIG. 13.
Figure 16:
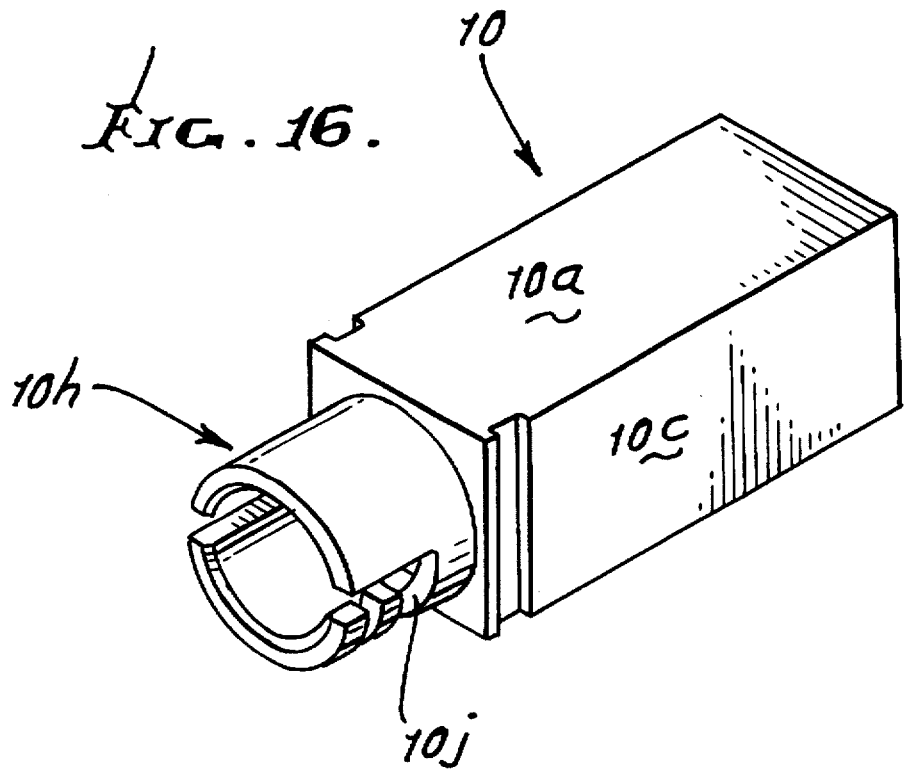
FIG. 16 is a perspective view of the housing shown in FIG. 13.
Figure 25:
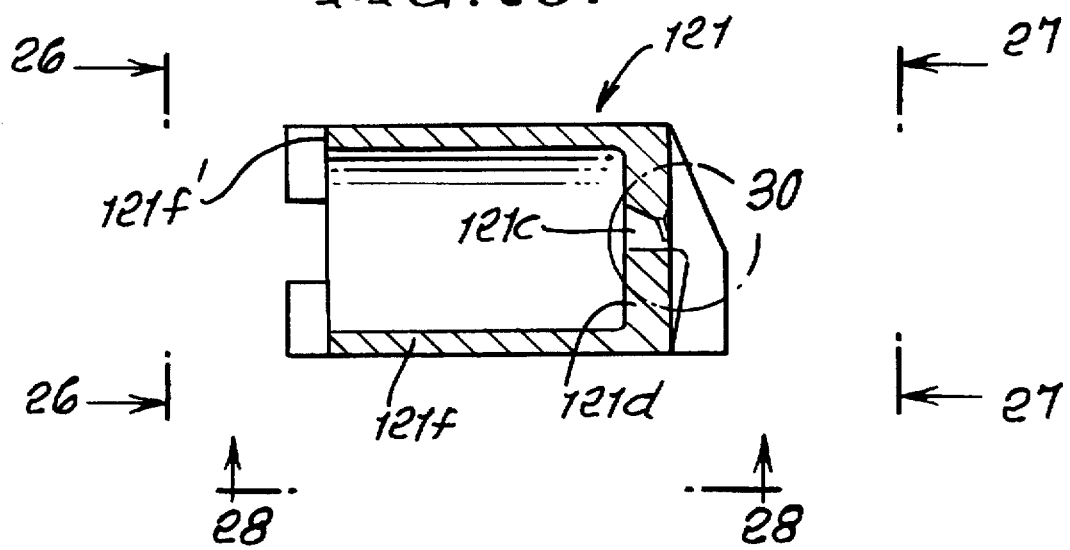
FIG. 25 is a view like FIG. 17 but showing a longer base, as also seen in FIG. 2 in a detector housing, like the housing shown in FIGS. 13-16, but endwise reversed.
Figure 26:
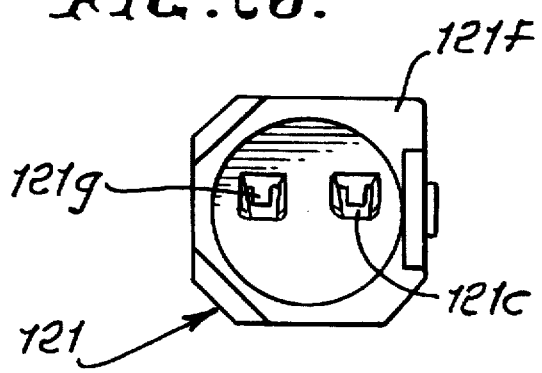
FIG. 26 is an end view taken on lines 26—26 of FIG. 25.
Figure 27:
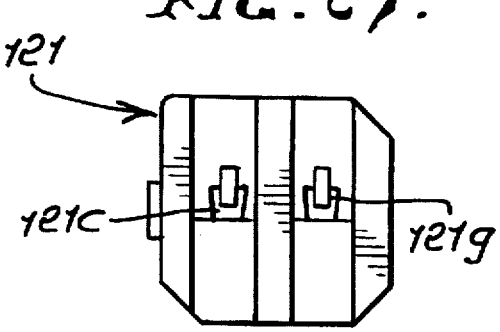
FIG. 27 is an end view taken on lines 27—27 of FIG. 25.
Figure 28:
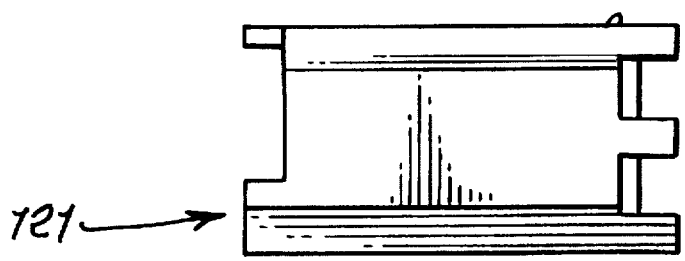
FIG. 28 is a bottom view taken on lines 28—28 of FIG. 25.
Figure 39:
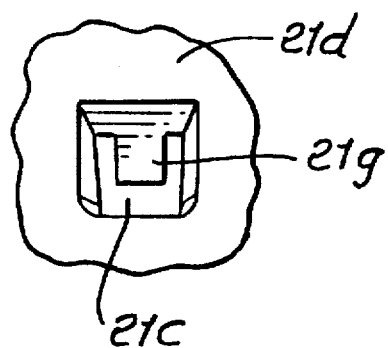
Figure 40:
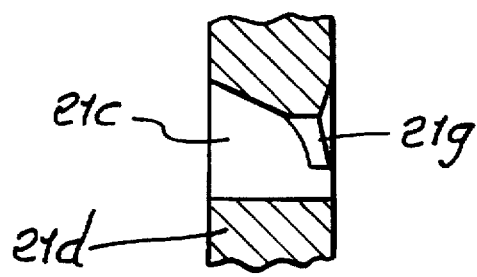
Figure 41:
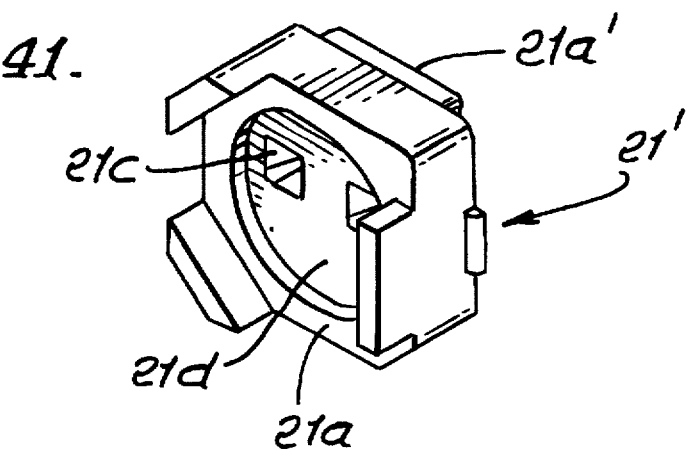
Figure 42:
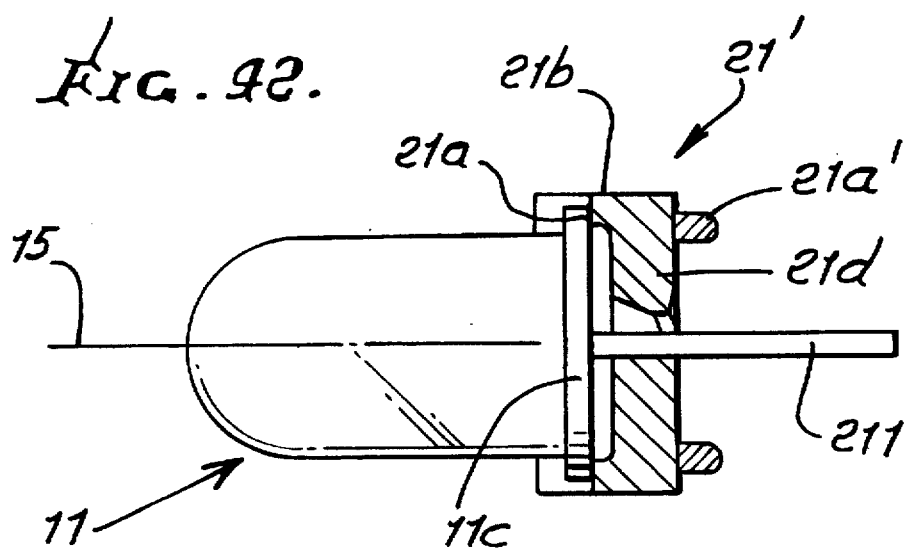
FIG. 42 is a section showing an LED carried by the base element of FIGS. 35–41.
Figure 47:
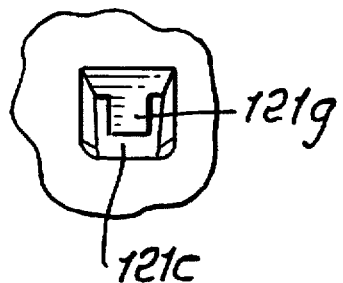
Figure 48:
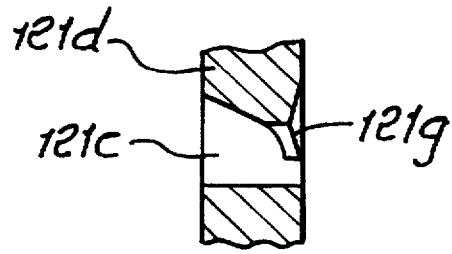
Figure 49:
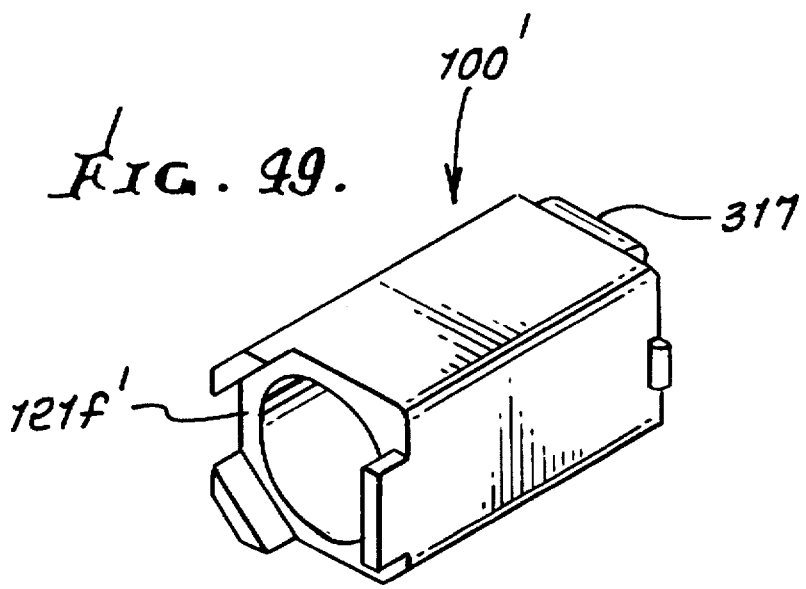
Figure 50:
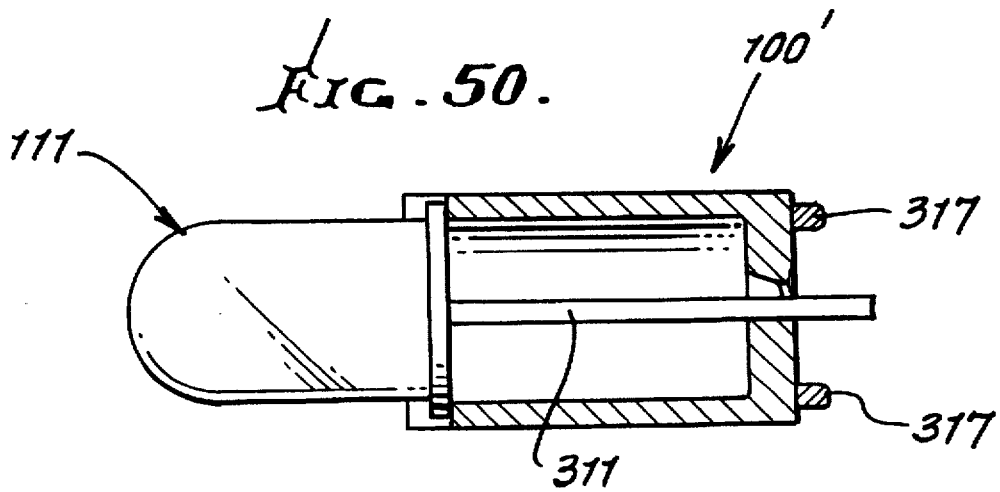
FIG. 50 is a section showing an LED carried by the base element of FIGS. 43–49.

The hollow mounting means may be in the form of a block having upper and lower side walls 10a and 10b, lateral side walls 10c and 10d (see FIG. 15), open end 10e, and end wall 10f (see FIG. 13). A longitudinal central axis appears at 15. An internal peripherally extending shoulder 14 rightwardly faces open end 10e, and is adapted to leftwardly seat external flange 13a on the light pipe, as seen in FIG. 2. An annularly tapered bore 16 in end wall 10f seen in FIG. 13 is adapted to closely receive the small end 13b of the light pipe. Note that the light pipe, which is formed of solid, transparent material, such as acrylic plastic, has an exterior annular outer surface 13c tapering from flange 13a to end 13b of the pipe. The diametrically enlarged rightward convex surface 13d of the light pipe abuts the leftwardmost surface extent of the LED lens 11a at 11b.

The LED has a base flange 11c received against a shoulder 21a on a supporting base 21. See FIGS. 2, 17 and 24. That base has a periphery 21b closely received telescopically in bore 10g of the mounting means 10, and bonding material may be received therebetween to bond the base in assembled position in 10; or, domed lens 11a may be assembled and held against the convex end 13d of the light pipe.

A projection 17 at the outer side of the housing body has a deflectible bayonet connection thereon at 17a to connect into an opening 18 in a circuit board 19, as seen in FIG. 13, to firmly attach the housing to the board. Terminals 11e extend rightwardly through openings 21c in the transverse wall 21d of the base 21, and then downwardly at 11e' (see FIG. 24) to pass through openings 18a in the circuit board for connection to board circuitry 19a. Deflectable leaf wipers 21g at openings 21c sidewardly engage the terminals and position them. Also note positioning projection 60 on the side of 10, to extend in an opening 61 in the board 19. See FIGS. 17–24, and FIG. 2.

A cable connector 30, which is tubular, carries the rightward end 12a of cable 12, and has a reduced end 30a, carrying external trunnion-type tangs at 31, to interfit J-slots 32 in 10h upon telescopic connection to that housing reduced diameter leftward extent 10h, and clockwise rotation, which is reversely releasable. Push connection assures that tangs 31 ride over the "over-center" captivating bumps 10m, and into slots 10n, with pressure maintenance. See FIGS. 1 and 3, and knurled surface 30b enabling finger gripping and turning of the connector. Reliefs 10p permit bumps 10m to resiliently deflect upon such connection. Bore 30g of 30 closely receives the cable. See FIG. 9.

The rightward end 30c of the connector carrying the tangs is axially split at 30d (see FIG. 11), to form two sections 30e. Those sections are displaced a small amount toward one another, to grip the cable, as the tangs are rotated into the recesses of the J-slots, by interfering interengagement of internal shoulders 10j on the housing, see FIG. 13, against external flat cam shoulders 30g on the sections 30e. The cable end was previously located in end abutting relation with leftward surface 10e' of end wall 10f of the housing, whereby correct optical spacing is maintained. See FIG. 13.

The assembly, as described, enables maximum light flux transmission from the LED into the fiber optics cable 11, via the truncated and domed light pipe 13. See the rays indicated in broken lines in FIG. 2, the light pipe convex surface 13d refracting light, as shown. Light entrance end or surface 13d is relatively large in diameter, i.e., proximate the diameter of the LED lens 11a; and light exit end 13b of pipe 13 is relatively small in diameter, i.e., proximate the diameter of the cable end 12a with which 13a is optically aligned.

Referring to FIGS. 2 and 25–32, a tubular housing is provided at 100 for a photodetector generally indicated at 111. The housing 100 may have the same construction as the housing 10, for simplicity and minimum cost. The connector portion 130 of housing 100 receives the opposite end portion 12d of the light pipe 12, and in the same positioned and connected relation as the first described end of the light pipe is received, positioned and connected in position by 30.

Sideward projection 117 from housing 100 has a bayonet connection 117a received through an opening, as shown in a panel 119, in FIG. 2, for sidewise mounting of the housing on that panel, as was the same for housing 10 sidewise connected to panel 19 described above.

End terminals 111e project through end wall 121d of a base 121, as shown in FIG. 2 and FIGS. 25–32. That base has a skirt 121f slidably received into the bore 100k in the housing 100, to seat detector 111 against internal wall 100g. After passing through openings 121c in end wall 121d, terminals 111e bend downwardly at 111e' to extend sidewardly through openings 118a in the panel 119, for connection to circuitry indicated at 119a. See FIGS. 2 and 32.

Connector 130, the same as connector 30 in construction, may have J-slot connection to the housing 100 extension 100h, in the same manner as described above, in connection with FIG. 1 etc. Light traveling through the light pipe is detected by the detector 111 which may comprise a photodetector. No light pipe is shown in FIG. 2 in association with detector 111, the wall or skirt 121f of the base being elongated to compensate for absence of light pipe in the assembly. Reduced length bore wall 140 of the housing engages the photodetector to align it.

Turning now to FIGS. 33–49, the elements thereof the same as in FIGS. 1–32 are given the same numbers. The difference in structure has to do with endwise connection of the assembly to panel or circuit board elements indicated at 219 (corresponding to board 19) and panel 319 (corresponding to panel 119). Note in this regard that housing 10 has endwise connection, via projections 217 on the end of the housing, and extending parallel to axis 15, to extend through openings 218 in board 219. See also FIG. 52 and FIG. 54 showing three projections 217 as having hook shape, and a fourth guide projection 217'. The terminals 211 project from LED through openings 218 in the board 219 for connection to circuitry 219a. Accordingly, the terminals 211 extend and are mounted parallel to axis 15. Part 21' corresponds to 21, and has end stand offs 21a'.

Similarly, the detector housing 100', seen in FIGS. 43–49, has end projections 317 which project through openings 318 in panel 319, and parallel to the axis of housing 100'. A lead or leads 311 from the photodetector 111 extend axially endwise through an opening or openings 318a in panel 319 for connection to circuitry 319a. Other numerals are the same as in FIGS. 25–31. Therefore, it is seen that the apparatus has great flexibility and utility with minimum parts, to transmit maximum light flux from an LED, and via a fiber optics cable to a light detector, for use as required.

I claim:

1. In combination,
   a) a tubular mounting means having a longitudinal axis,
   b) an LED received by said mounting means and having a light emitter and a light-passing lens oriented along said axis,
   c) a cable having optical fibers defining a light entrance end at a location facing longitudinally toward the LED, and spaced therefrom,
   d) a light-transmitting light pipe received in said mounting means, and located longitudinally between the LED lens and said cable entrance end,
   e) and a hollow connector having a first portion to receive said cable and to position said cable entrance end at said location, the connector having means thereon to engage the cable and to resist endwise withdrawal of the cable relative to said connector and mounting means.

2. The combination of claim 1 wherein said light pipe tapers toward said cable entrance end.

3. The combination of claim 2 wherein said light pipe has a generally conical surface oriented to reflect light rays from the LED lens toward said cable entrance end.

4. The combination of claim 3 wherein said light pipe has a convex surface facing toward said LED lens.

5. The combination of claim 4 wherein said LED lens is convex toward and proximate to said light pipe convex surface.

6. The combination of claim 1 wherein said LED lens is convex toward said light pipe.

7. The combination of claim 1 wherein said light pipe has a relatively large entrance end and a relatively small exit end, said entrance end located proximate said LED lens, and said exit end located proximate said cable entrance end.

8. The combination of claim 1 wherein said LED has terminal means extending externally of the mounting means and longitudinally, whereby the mounting means may extend endwise normal to a supporting circuit board.

9. The combination of claim 1 wherein the LED has terminal means extending externally of the mounting means, and laterally, whereby the mounting means may extend sidewise relative to a supporting circuit board.

10. The combination of claim 1 wherein said mounting means has a wall defining an orifice, said cable entrance end aligned with and extending proximate said orifice, said light pipe having a reduced end aligned with and extending proximate said orifice.

11. The combination of claim 1 wherein said connector and said mounting means have releasable J-slot interconnection.

12. The combination of claim 1 wherein said mounting means includes a tubular body, and a base having telescopic interfit with said body at one end thereof, and defining openings to pass LED terminals.

13. The combination of claim 12 wherein said base supports said LED and positions the LED in said tubular body.

14. The combination of claim 12 wherein the base has wipers at said openings to slidably engage the LED terminals along their lengths.

15. The combination of claim 1 including interengageable cam surfaces on the connector and mounting means to deflect the connector toward and into gripping engagement with the cable, in response to completed connection of the connector to the mounting means.

16. The combination of claim 15 including a J-slot interconnection of the connector to the mounting means allowing rotation of the connector to complete said interconnection and cam surface interengagement, as aforesaid.

17. In combination,
   a) a tubular mounting means having a longitudinal axis,
   b) an LED received by said mounting means and having a light emitter and a light-passing lens oriented along said axis,
   c) a cable having optical fibers defining a light entrance end at a location facing longitudinally toward the LED, and spaced therefrom,
   d) a light-transmitting light pipe received in said mounting means, and located longitudinally between the LED lens and said cable entrance end,
   e) and including a photodetector to which the cable has optical connection, and a tubular housing containing said photodetector.

18. The combination of claim 17 including a hollow connector carried by said mounting means and having a first portion to receive said cable and to position said cable entrance end at said location, the connector having means thereon to engage the cable and to resist endwise withdrawal of the cable relative to said connector and mounting means.

19. The combination of claim 17 wherein said tubular housing for said photodetector and said tubular mounting means have closely similar construction.

20. The combination of claim 17 including a first circuit board to which said tubular mounting means is connected, and support means to which said photodetector tubular housing is connected.

21. The combination of claim 20 including a projection on said mounting means and received by the circuit board to locate said mounting means relative to said board, said projection is one of the following:

i) lateral projection at a side of said mounting means, ii) longitudinal projection at an end of said mounting means.

22. The combination of claim 21 wherein the LED has terminals projecting for electrical connection to circuitry on said board, said terminals extending in the direction of said projection.

23. For combination with a fiber optics cable and a light source, the improvement comprising:

a) a mounting means defining a longitudinal axis, b) a connector having a bore to recieve the cable to extend longitudinally axially for passing light from said source, c) the connector having means thereon to sidewardly engage the cable to position the cable and to resist endwise withdrawal of the cable relative to said connector and said mounting means.

24. The improvement of claim 23 including said fiber optics cable received in said bore.

25. The improvement of claim 24 wherein said cable has an end face at which optical fibers terminate, said end face facing axially relative to said mounting means.

26. The improvement of claim 25 including said light source located to transmit light axially, and said cable end face facing toward said light source.

27. The improvement of claim 26 wherein said light source is an LED.

28. The improvement of claim 26 including light-transmitting media located between said cable end face and said light source.

29. The combination of claim 26 wherein said means to sidewardly engage the cable comprises cable grip means.

30. The improvement of claim 23 including said light source located to transmit light axially relative to said mounting means.

31. The improvement of claim 30 wherein said light source is an LED.

32. The improvement of claim 23 wherein said means to sidewardly engage the cable includes holding elements projecting toward the side of the cable.

33. The improvement of claim 32 wherein said elements are located at said bore and spaced longitudinally thereal-ong.

34. The combination of claim 23 wherein said means to sidewardly engage the cable comprises cable grip means.

* * * * *